(12) United States Patent
Wang

(10) Patent No.: US 7,469,614 B2
(45) Date of Patent: Dec. 30, 2008

(54) ELECTRONIC ACTUATED SHIFTER FOR AUTOMATIC TRANSMISSIONS

(75) Inventor: Yong Qiang Wang, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 409 days.

(21) Appl. No.: 10/812,664

(22) Filed: Mar. 30, 2004

(65) Prior Publication Data
US 2005/0223835 A1 Oct. 13, 2005

(51) Int. Cl.
*B60K 20/00* (2006.01)
*G05G 5/00* (2006.01)

(52) U.S. Cl. .................. 74/473.23; 74/473.26

(58) Field of Classification Search ............... 74/473.23, 74/473.3, 473.1, 538, 473.35, 473.22, 473.21, 74/473.18, 473.12, 473.15, 473.25, 473.26
See application file for complete search history.

(56) References Cited

U.S. PATENT DOCUMENTS

| | | | |
|---|---|---|---|
| 4,473,141 A | 9/1984 | Mochida | |
| 4,909,096 A | 3/1990 | Kobayashi | |
| 5,062,509 A * | 11/1991 | Carpenter et al. | 477/96 |
| 5,220,984 A * | 6/1993 | Ruiter | 192/220.4 |
| 5,263,383 A * | 11/1993 | Meisch et al. | 74/473.23 |
| 5,277,077 A * | 1/1994 | Osborn | 74/473.21 |
| 5,314,049 A * | 5/1994 | Nordstrom | 477/96 |
| 5,445,046 A * | 8/1995 | Kataumi et al. | 74/527 |
| 5,651,293 A * | 7/1997 | Ebenstein | 74/473.3 |
| 5,775,166 A * | 7/1998 | Osborn et al. | 74/473.25 |
| 6,038,939 A * | 3/2000 | Wheeler | 74/473.3 |
| 6,196,078 B1 | 3/2001 | DeJonge | |
| 6,230,579 B1 * | 5/2001 | Reasoner et al. | 74/473.18 |
| 6,431,339 B1 | 8/2002 | Beattie | |
| 2004/0244524 A1 * | 12/2004 | Russell | 74/473.23 |

* cited by examiner

*Primary Examiner*—Richard W Ridley
*Assistant Examiner*—James Pilkington
(74) *Attorney, Agent, or Firm*—Richard Mescher; Porter, Wright, Morris & Arthur, LLP; Dean B. Watson (57) ABSTRACT

A shifter mechanism includes a shifter lever movable along a shift path and a detent plate movable with the shifter lever along the shift path and forming a detent profile defining a plurality of gear positions. A pawl is movable between a locking position wherein the pawl engages the detent profile to lock the shifter lever in one of the plurality of gear positions and an unlocking position wherein the shifter lever is movable along the shift path between the plurality of gear positions. A pivotable detent lever carries the pawl over an arcuate path between the locking position and the unlocking position. A linear actuator is operatively coupled to the detent lever to selectively pivot the detent lever. The pawl preferably includes a roller that engages the detent profile when the pawl is in the locking position.

20 Claims, 5 Drawing Sheets

ELECTRONIC ACTUATED SHIFTER FOR AUTOMATIC TRANSMISSIONS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a shifter mechanism for controlling automatic transmissions of motor vehicles and, more particularly, to a shifter mechanism having an electronic actuated detent assembly for holding a shifter lever in a desired gear position against inadvertent movement to other gear positions and selectively permitting desired movement of the shifter lever to other gear positions.

BACKGROUND OF THE INVENTION

In a vehicle equipped with an automatic transmission, a shifter lever mechanism is typically pivotable over a series of positions representative of desired transmission gears such as, for example, park (P), reverse (R), neutral (N), drive (D), and low gear (M). The shifter mechanism is connected to the motor vehicle automatic transmission by a suitable mechanical and/or electronic operating linkage to effect actuation of the transmission to the selected gear when the shifter lever is pivoted to the transmission gear's representative position. The shifter mechanism is typically provided with a detent assembly which releasably holds the shifter lever mechanism in a desired position to prevent inadvertent movement to other positions but permit desired movement to other positions. The detent assembly typically includes a mechanical actuator which is manually operated to release the detent assembly and permit manual pivoting of the shifter lever mechanism to a new position.

Attempts have been made to replace the mechanical actuator with an electronic actuator. For example, see U.S. Pat. No. 5,220,984, the disclosure of which is expressly incorporated herein in its entirety by reference. This shifter mechanism attempts to simplify construction by providing an electrically actuated detent assembly having a locking pawl moved by an electric solenoid.

While prior electronic shifter mechanisms may eliminate the need for a mechanical actuator, they typically have very poor preload capability. When the shifter lever is slightly pushed or pulled before the detent assembly is electrically actuated, the locking pawl as well as the electric solenoid are laterally loaded and the electric solenoid may not be able to overcome the friction present in the mechanism. As a result, the electric solenoid may not be able to unlock the locking pawl. To overcome this problem, the electric solenoid must be sized to provide a relatively large force and/or the locking pawl must be held in its locking position with a relatively small preload. Neither of which are desirable. Accordingly, there is a need in the art for an improved electronic shifter mechanism.

SUMMARY OF THE INVENTION

The present invention provides a shifter mechanism which overcomes at least some of the above-noted problems of the related art. According to the present invention, a shifter mechanism comprises, in combination, a shifter lever movable along a shift path and a detent plate movable with the shifter lever along the shift path and forming a detent profile defining a plurality of gear positions. A pawl is movable between a locking position wherein the pawl engages the detent profile to lock the shifter lever in one of the plurality of gear positions and an unlocking position wherein the shifter lever is movable along the shift path between the plurality of gear positions. An actuator is operatively coupled to the pawl to selectively move the pawl. The pawl includes a roller that engages the detent profile when the pawl is in the locking position.

According to another aspect of the present invention, a shifter mechanism comprises, in combination, a shifter lever movable along a shift path and a detent plate movable with the shifter lever along the shift path and forming a detent profile defining a plurality of gear positions. A pawl is movable between a locking position wherein the pawl engages the detent profile to lock the shifter lever in one of the plurality of gear positions and an unlocking position wherein the shifter lever is movable along the shift path between the plurality of gear positions. A pivotable detent lever carries the pawl over an arcuate path between the locking position and the unlocking position. A linear actuator is operatively coupled the detent lever to selectively pivot the detent lever.

According to yet another aspect of the present invention, a shifter mechanism comprises, in combination, a shifter lever movable along a shift path and a detent plate movable with the shifter lever along the shift path and forming a detent profile defining a plurality of gear positions. A pawl is movable between a locking position wherein the pawl engages the detent profile to lock the shifter lever in one of the plurality of gear positions and an unlocking position wherein the shifter lever is movable along the shift path between the plurality of gear positions. An actuator is operatively coupled to the pawl to selectively move the pawl. A spring plate is movable with the shifter lever along the shift path and forms a secondary detent profile. A spring engages the secondary detent profile as the shifter lever moves over the shift path to provide frictional resistance to the movement of the shifter lever.

From the foregoing disclosure and the following more detailed description of various preferred embodiments it will be apparent to those skilled in the art that the present invention provides a significant advance in the technology and art of motor vehicle shifter mechanisms. Particularly significant in this regard is the potential the invention affords for providing a high quality, reliable, low cost assembly having improved preload capability. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
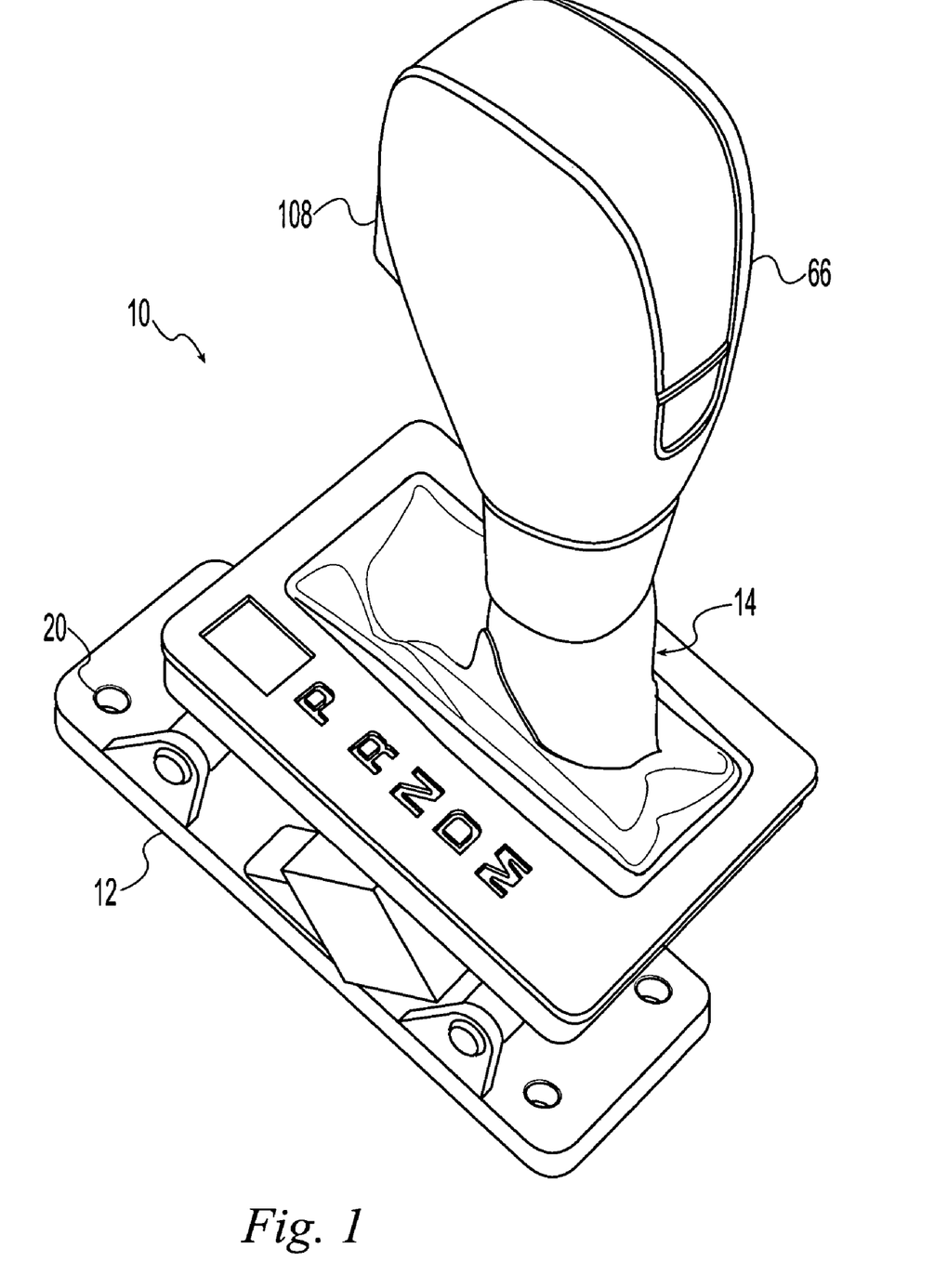
FIG. 1 is a perspective view of a shifter mechanism according to a preferred embodiment of the present invention.
Figure 2:
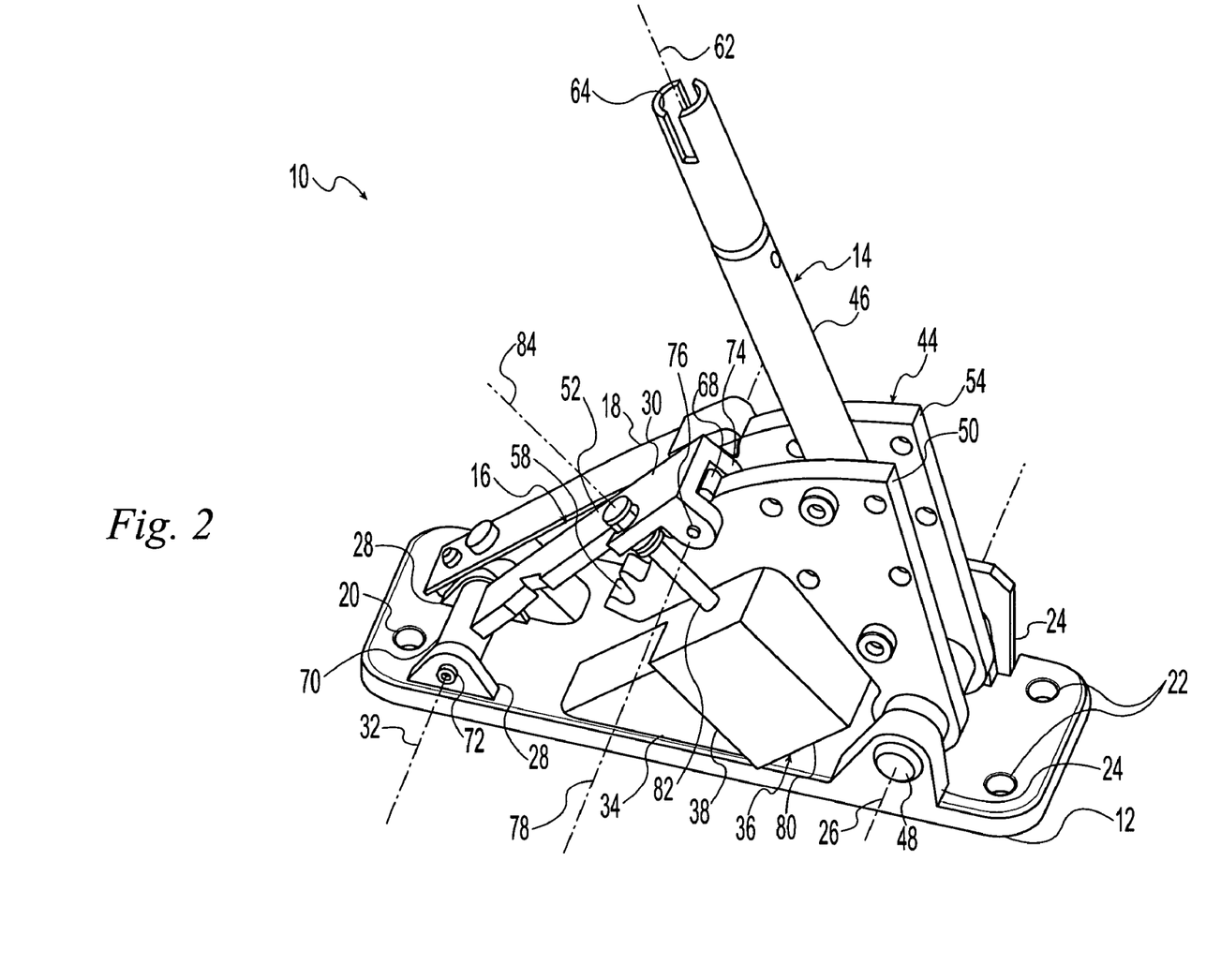
FIG. 2 is a perspective view of the shifter mechanism of FIGS. 1 and 2 generally showing the left and rear sides of the shifter mechanism with components removed for clarity.
Figure 3:
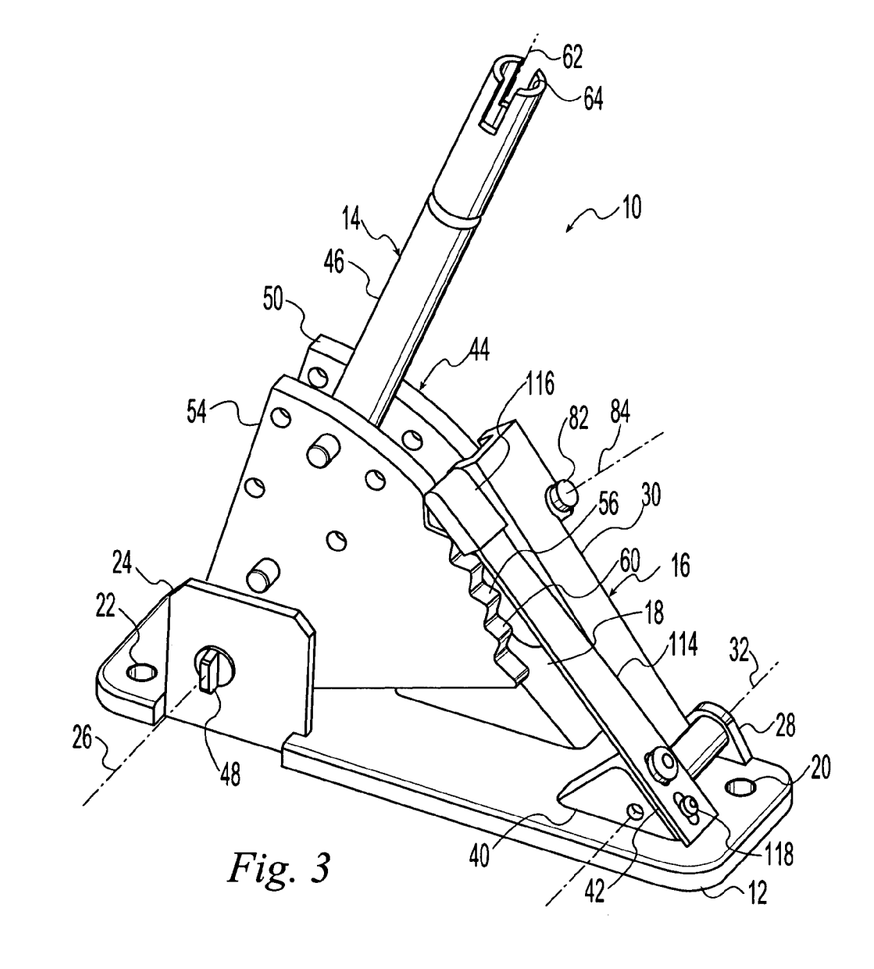
FIG. 3 is a perspective view of the shifter mechanism of FIG. 1 and generally showing the right and front sides of the shifter mechanism with components removed for clarity.

It should be understood that the appended drawings are not necessarily to scale, presenting a somewhat simplified representation of various preferred features illustrative of the basic principles of the invention. The specific design features of a shifter lever mechanism as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter lever mechanism illustrated in the drawings. In general, up or upward generally refers to an upward direction in FIG. 1 and down or downward generally refers to a downward direction in FIG. 1. Also in general, fore or forward refers to a direction toward the front of the vehicle, that is, generally toward the left in FIG. 1 and aft or rearward refers to a direction toward the rear of the vehicle, that is, generally toward the right in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter lever mechanism disclosed herein. The following detailed discussion of various alternative and preferred embodiments will illustrate the general principles of the invention with reference to a shifter lever mechanism for a motor vehicle such as an automobile, sport utility vehicle (SUV), or truck. Other embodiments suitable for other applications will be apparent to those skilled in the art given the benefit of this disclosure.

Referring now to the drawings, FIGS. 1 to 4 show a shifter mechanism 10 according to a preferred embodiment of the present invention. The illustrated shifter mechanism 10 includes a frame or base 12, a shifter lever assembly 14 pivotably mounted to the base 12, a lock or detent assembly 16 releasably holding the shifter lever assembly 14 in a desired one of a plurality of gear positions against undesired or inadvertent movement to the other gear positions, and a spring 18 providing the feel of a traditional mechanical system when selectively moving the shifter lever between the plurality of gear positions.

The base 12 is adapted to be attached to the motor vehicle in a fixed position such as a floor or console and can be formed of any suitable size and shape. The illustrated base 12 is generally planar and shaped to engage the motor vehicle in a desired manner. The forward end of the base is provided with an opening or hole 20 for receiving a mechanical fastener such as bolts to secure the base 12 to the motor vehicle. The rearward end of the base 12 is provided with a pair of openings or holes 22 for receiving mechanical fasteners such as bolts to secure the base 12 to the motor vehicle. Other suitable shapes for the base 12 and the attachment means 20, 22 will be apparent to those skilled in the art. A pair of upwardly extending pivot flanges 24 are provided near the rear of the base 12 at lateral sides of the base 12. The pivot flanges 24 are laterally spaced apart and provided with coaxial openings for pivotably mounting the shifter lever assembly therebetween as described in more detail hereinafter. The flange openings define a horizontal and laterally extending pivot axis 26 for the shifter lever assembly 14. A second pair of upwardly extending pivot flanges 28 are provided near the forward end of the base 12 toward the left side of the base 12. The pivot flanges 28 are laterally spaced apart and provided with coaxial openings for pivotably mounting a detent lever 30 of the detent assembly 16 therebetween as described in more detail hereinafter. The flange openings define a horizontal and laterally extending pivot axis 32 for the detent lever which is generally parallel to and spaced apart from the pivot axis 26 for the shifter lever assembly. A mounting block or bracket 34 is provided along the left side of the base 12. The mounting bracket 34 supports an actuator 36 of the detent assembly 16 as described in more detail hereinafter. The illustrated mounting bracket 34 is generally wedge or triangular-shaped to provide an inclined surface 38 facing in a generally upward and rearward direction for supporting the actuator 36. Another mounting block or bracket 40 is provided near the front end of the base 12 along the right side of the base 12 adjacent the pivot flanges 28 of the detent lever 30. The mounting bracket 40 supports the spring 18 as described in more detail hereinafter. The illustrated mounting bracket 40 is generally wedge or triangular-shaped to provide an inclined surface 42 facing in a generally upward and forward direction for supporting the spring 18.

The base 12 can be formed of any suitable material such as, for example, plastic and can be produced by any desirable method such as molding. Preferably, the base 12 is formed of unitary or one-piece construction but alternatively can be constructed of multiple components secured together.

The illustrated shifter lever assembly 14 includes a shifter yoke 44 and a shifter post or lever 46 upwardly extending from the shifter yoke 44 for manually moving the shifter yoke 44 to change the gear of the transmission. The shifter yoke 44 is adapted for interacting with the spring 18 for providing a desired "feel" while moving to a desired position and the detent assembly 16 to selectively release the shifter lever assembly 14 from the previous position and maintain the shifter lever assembly 14 in the desired position. The lower end of the shifter yoke 44 is sized and shaped to extend between the pivot flanges 24 of the base 12. A horizontal, laterally extending pivot pin 48 cooperates with the flange openings to provide a pivotable connection between the shifter yoke 44 and the base 12. Pivotably connected in this manner, the shifter yoke 44 is pivotable relative to the base 12 about the laterally extending pivot axis 26.

The illustrated shifter yoke 44 includes a first or detent plate 50 having a gate or detent profile 52 and a second or spring plate 54 having a secondary detent profile 56. The illustrated detent and spring plates 50, 54 are each generally "pie shaped", that is, a segment of a circle having an arcuate edge and a pair of non-parallel and non-perpendicular generally linear edges extending from the opposed ends of the arcuate edge. The illustrated plates 50, 54 are vertically disposed, parallel and laterally spaced apart, and positioned such that the arcuate edge is located opposite the pivot axis 26 to pivot about the pivot axis 26. Constructed in this manner, the arcuate edge has a center of curvature at or near the pivot axis 26.

The arcuate edge of the detent plate 50 forms the gate profile 52. The illustrated gate profile 52 is an outward facing contoured surface formed by a plurality of downward facing grooves or notches 58 formed therein. The grooves 58 correspond with various gear positions in which the shifter lever assembly 14 can be shifted to provide a desired gear at the transmission of the motor vehicle. The grooves 58 can indicate positions such as park (P), reverse (R), neutral (N), drive (D), and low gear (M). The shifter lever assembly 14 is suitably connected, either mechanically and/or electrically, to the transmission of the motor vehicle such that movement the shifter lever 46 to the various positions causes the transmission to move to the corresponding gear. The grooves 58 pivot about the pivot axis 26 with the detent plate 50 when the shifter yoke 44 is pivoted about the pivot axis 26 relative to the base 12 and are sized and shaped to cooperate with the detent lever 30 to limit movement as discussed in more detail hereinbelow. The illustrated grooves 58 are arcuate and are each similarly sized and shaped. It is noted that the grooves 58 can alternatively have other suitable shapes such as, for example, a rectangular or square shape and can each be shaped differently from one another if desired. It is also noted that the contoured surface of the gate profile 52 can alternatively be formed in other manners such as, for example, spaced apart protrusions and/or can alternatively have any desired shape and size.

The arcuate edge of the spring plate 54 forms the secondary detent profile 56. The illustrated secondary detent profile 56 is an outward facing contoured surface formed by a plurality of outward facing grooves or notches 60 formed therein. The grooves 60 correspond with the various gear positions in which the shifter lever assembly 14 can be shifted to provide a desired gear at the transmission of the motor vehicle. The grooves 60 can indicate positions such as park (P), reverse (R), neutral (N), drive (D), and low gear (M). The shifter lever assembly 14 is suitably connected, either mechanically and/or electrically, to the transmission of the motor vehicle such that movement the shifter lever 46 to the various positions causes the transmission to move to the corresponding gear. The grooves 60 pivot about the pivot axis 26 with the spring plate 54 when the shifter yoke 44 is pivoted about the pivot axis 26 relative to the base 12 and are sized and shaped to cooperate with the spring 18 to provide a desired "feel" as discussed in more detail hereinbelow. The illustrated grooves 60 are generally triangular shaped and are each similarly sized and shaped. It is noted that the grooves 60 can alternatively have other suitable shapes such as, for example, arcuate shaped or rectangular or square shaped and can each be shaped differently from one another if desired. It is also noted that the contoured surface of the secondary detent profile 56 can alternatively be formed in other manners such as, for example, spaced apart protrusions and/or can alternatively have any desired shape and size.

The shifter yoke 44 can be formed of any suitable material such as, for example, plastic and can be produced by any desirable method such as molding. Preferably, the shifter yoke 44 is formed of unitary or one-piece construction but alternatively can be constructed of multiple components secured together.

Figure 4:
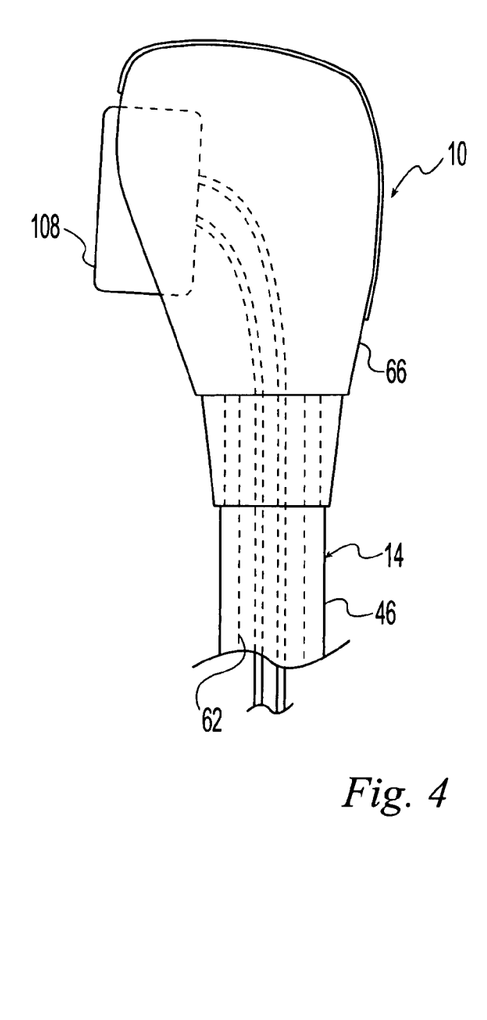
FIG. 4 is a fragmented perspective view of a shifter lever knob of the shifter mechanism of FIGS. 1 to 3.

The illustrated shifter lever 46 is generally an elongate tube having a central axis 62 and forming a hollow central passage 64 extending along the central axis 62. The lower end of the shifter lever 46 is adapted to extend into an opening in the shifter yoke 44. The shifter lever 46 can be rigidly secured to the shifter yoke 44 in any suitable manner such as, for example, snap-connectors, welding, adhesives, or mechanical fasteners or the shifter lever 46 can be formed unitary, that is as one piece, with the shifter yoke 44. With the shifter lever 46 rigidly secured to shifter yoke 44, the shifter yoke 44 can be selectively pivoted about the pivot axis 26 by manually applying a forward or rearward force to the shifter lever 46. As best shown in FIG. 4, the upper end of the shifter lever 46 is preferably provided with handle or knob 66. The knob 66 is preferably provided with a shape to provide a suitable gripping surface for the hand of the operator.

The illustrated lock or detent assembly 16 includes a pawl 68 movable into and out of engagement with the gate profile 52 to lock and unlock the shifter yoke 44 against pivotable movement relative to the base 12 and the actuator 36 for selectively moving the pawl 68 into and out of engagement with the gate profile 52. The pawl 68 is carried by the detent lever 30. The detent lever 30 is of rigid construction and is a generally elongate member having a first end adapted to pivotably connect the detent lever 30 to the base 12 and second end adapted to carry the pawl 68. The illustrated detent lever 30 is rectangular-shaped in cross-section but any suitable shape can be utilized. The illustrated first or lower end is in the form of a hub 70 having a laterally extending opening. A horizontal, laterally extending pivot pin 72 extends through the flange openings and the hub opening to provide a pivotable connection between the detent lever 30 and the base 12. Pivotably connected in this manner, the detent lever 30 is pivotable relative to the base 12 about the laterally extending pivot axis 32. The illustrated second or upper end is provided with a pair of downwardly extending and laterally spaced apart flanges 74. The flanges 74 are preferably spaced apart a distance adequate to receive the arcuate edge of the detent plate 50 therebetween. The flanges 74 are provided with coaxial openings to secure the pawl 68 thereto as described in more detail hereinafter.

The illustrated pawl 68 is a wheel or roller. An axle or pin 76 extends through the roller 68 and the openings in the detent lever flanges 74 to rotatably secure the roller 68 to the second end of the detent lever 30 about a laterally extend rotational axis 78. Mounted in this manner, the roller 68 is rotatable relative to the detent lever 30 about the rotational axis 78. The rotational axis 78 is preferably substantially parallel to the pivot axis 26 of the shifter yoke 44 and the pivot axis 32 of the detent lever 30. The roller 68 is sized and shaped to closely to cooperate with the grooves 58 of the detent plate 50 so that the roller 68 blocks and limits pivotal movement of the shifter lever assembly 14 when the pawl 68 in one of the grooves 58 but permits pivotal movement of the shifter lever assembly 14 when the pawl 68 is removed from the grooves 58.

The illustrated actuator 36 is a linear actuator in the form of an electric solenoid but any other suitable actuator can be utilized within the scope of the present invention. The illustrated solenoid 36 includes a body or housing 80 and an extendable pin or shaft 82. The pin 82 has a central longitudinal axis 84 and is typically in a retracted position (best shown in FIG. 2) but linearly moves along the central axis 84 to an extended position when the solenoid 36 is activated or energized. The solenoid body 80 is secured to the inclined surface 38 of the mounting bracket 34 with the pin 82 extending forward and upward in a direction generally perpendicular to the gate profile 52 of the detent plate 50. The free end of the solenoid pin 82 is suitably connected to the detent lever 30 to pivot the detent lever 30 as the solenoid pin 82 moves along its axial path. It is noted that the connection permits the pin 82 to move along a linear path while the detent lever 30 moves along an arcuate path. The illustrated pin 82 is operatively connected to the detent lever 30 with a slot-link type connection. The pin 82 is provided with a head or engagement surface on each side of the detent lever 30 so that the pin 82 both pulls and pushes the detent lever 30. When the solenoid 36 is unactivated, the pin 82 is in its retracted position such that detent lever 30 is pulled downward with the roller 68 in one of the grooves 58 of the gate profile 52 to lock the shifter yoke 44 in a desired position relative to the base 12. When the solenoid 36 is activated and the pin 82 linearly moves from the retracted position to the extended position, the pin 82 pushes the detent link 30 upward such that it pivots about the pivot axis 32. The pivoting motion of the detent link 30 moves the roller 68 from its locking position within the groove 58 to the unlocking position at least partially outside of the groove 58 so that the shifter yoke 44 can pivot to a desired position relative to the base 12. The roller 68 thereby moves along an arcuate path to the unlocking position, that is, out of the groove 58, by activating the linear solenoid 36.

When the solenoid 36 is deactivated, the pin 82 retracts from its extended position to its retracted position due to a spring bias. The pin 82 pulls the detent lever 30 pivot the detent lever 30 and move the roller 68 back to its locking position within one of the grooves 58. Thus, the solenoid 36 biases the pawl 68 into its locking position when the solenoid is deactivated.

Figure 5:
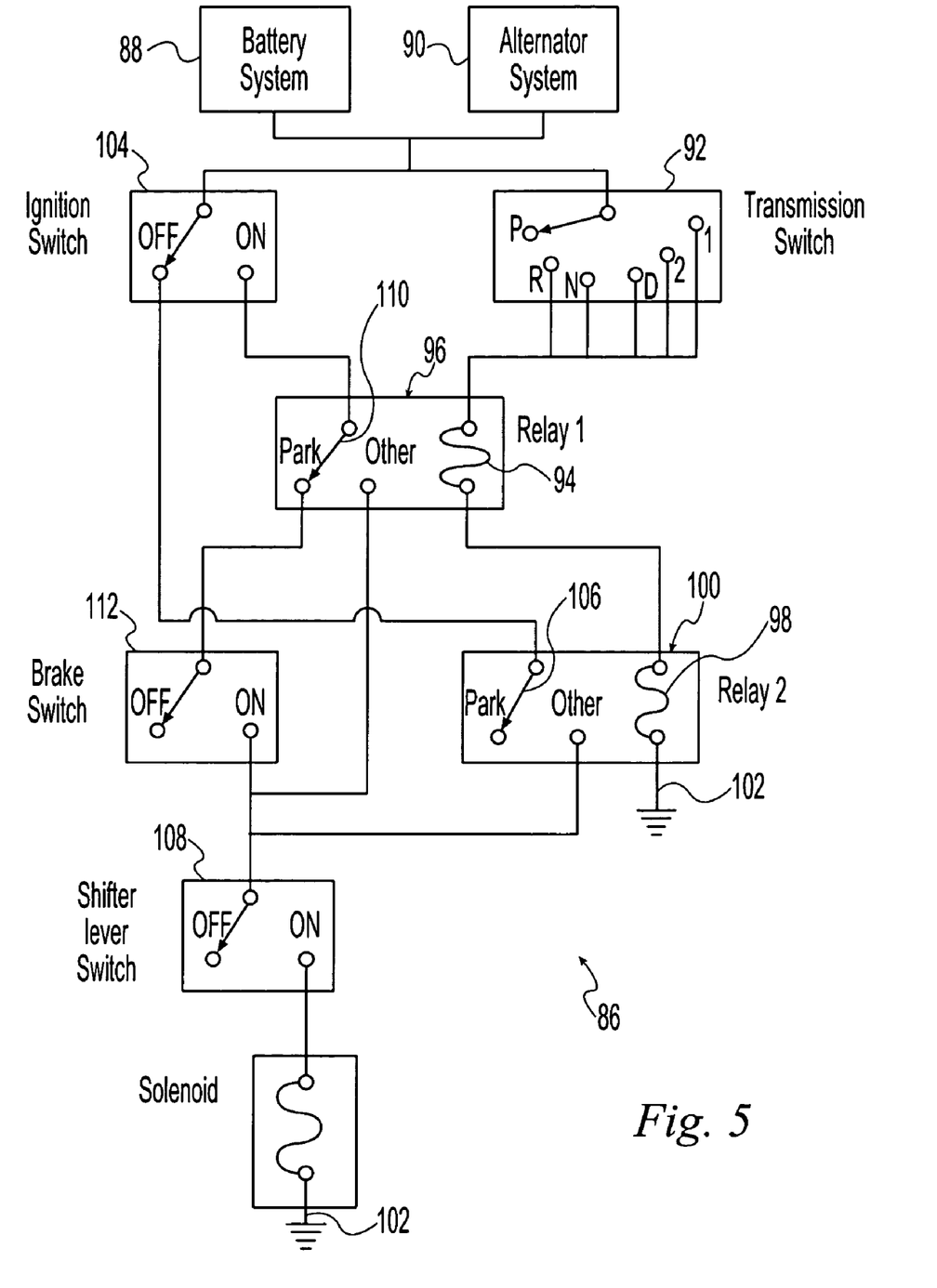
FIG. 5 is a schematic view of a control circuit for the shifter mechanism of FIGS. 1 to 4.

FIG. 5 schematically illustrates a preferred control circuit 86 for operation of the actuator 36. It is noted that any other suitable control circuit can be utilized within then scope of the present invention. The illustrated control circuit 86 connects the coil of the solenoid 36 with power sources such as the battery system 88 and ignition/alternator system 90 of the motor vehicle. The power source 88, 90 is connected to an input of a transmission or transaxle switch 92 which indicates the position of the shifter lever assembly 14 and the present gear of the transmission. When the transmission switch 92 indicates the shifter lever assembly 14 is a position other than the park position, continuity is provided from an output of the transmission switch 92 to an input of a coil 94 of a first relay 96. The output of the first relay coil 94 is connected to the input of a coil 98 of a second relay 100. The output of the second relay coil is connected to ground 102.

The power source 88, 90 is also connected to an input of an ignition switch 104 which indicates whether the ignition is on or off. When the ignition switch 104 is in the off position, continuity is provided from an output of the ignition switch 104 to an input of a switch 106 of the second relay 100 which is operated by the coil 98 of the second relay 100. When the second relay 100 is unenergized the circuit is open. When the second relay 100 is energized, the second relay switch 106 provides continuity from an output to an input of a shifter lever switch 108 which is off or on to indicate whether the operator desires to move the shifter lever assembly 14. The second relay coil 98 is energized whenever the transmission switch 92 is in a position other than park. When the shifter lever switch 108 is in the off position, the circuit is open. When the shifter lever switch 108 is in the on position, continuity is provided between an output of the shifter lever switch 108 and an input of the solenoid 36 having an output connected to ground 102. Thus when the ignition switch 104 is off, the solenoid 36 cannot be activated if the shifter lever assembly 14 is in the park position but can be activated if the shifter lever assembly 14 is in any other position. This prevents the operator from moving the shifter lever assembly 14 from the park position when the ignition switch is off but allows the operator to return the shifter lever assembly 14 to the park position if the ignition switch 104 was accidentally turned off before the shifter lever assembly 14 was moved to the park position.

When the ignition switch 104 is in the on position, continuity is provided from an output of the ignition switch 104 to an input of a switch 110 of the first relay 96 which is operated by the coil 94 of the first relay 96. With the first relay coil 94 energized, continuity is provided from an output of the first relay switch 110 to the input of the shifter lever switch 108. The first relay coil 94 is energized whenever the transmission switch 92 is in a position other than the park position. Thus, when the ignition switch 104 is on and the transmission switch 92 is in other than the park position, activation and deactivation of the solenoid 36 is controlled simply by activation and deactivation of the shifter lever switch 108 by the operator. With the first relay coil 94 unenergized, continuity is provided from an output of the first relay switch 110 to an input of a brake switch 112 which indicates if the brakes of the motor vehicle are applied by the operator. When the brake switch 112 is in the off position, the circuit is open. When the brake switch 112 is in the on position, continuity is provided between an output of the brake switch 112 and an input of the shifter lever switch 108. Thus, when the ignition switch 104 is on and the transmission switch 92 is in park position, the solenoid 36 can only be activated and deactivated by the shifter lever switch 108 if the operator is applying the brakes.

As best shown in FIG. 4, the shifter lever switch 108 is preferably provided on the knob 66 located at the top of the shifter lever 46. The shifter lever switch 108 is preferably located at a side of the knob 66 where the thumb or fingers of the operator are located so that the operator can activate the switch by simply grasping the knob 66. The shifter lever switch 108 is preferably a contact switch such as, for example, a push button switch or a dome switch. Wires connecting the switch 108 to the remainder of the circuit preferably extend through the hollow central passage 64 of the shifter lever 46.

The illustrated spring 18 includes a spring member 114 and an engagement head 116. The illustrated spring member 114 is an elongate planar leaf spring having a first end adapted to be connected to the base 12 and second end adapted to carry the engagement head 116. The illustrated spring member 114 is rectangular-shaped in cross-section but any suitable shape can be utilized. The illustrated first or lower end is provided with a pair of openings sized and shaped for cooperating with a pair of fasteners 118 to secure the spring member 114 to the inclined surface 42 of the mounting bracket 40. Secured in this manner, the spring member 114 extends in a direction substantially parallel with a plane tangent to the operative groove 60 of the secondary detent profile 56. The illustrated second or upper end is provided with the engagement head 116 which is rigidly secured thereto. The engagement head 116 is sized and shaped to closely to cooperate with the grooves 60 of the spring plate 54 so that the spring member 114 provides desired frictional resistance to the movement of the shifter lever assembly 14 even when the detent assembly 16 is in its unlocked position. As the shifter yoke 44 pivots relative to the base 12, the spring member 114 resiliently maintains the engagement head 116 in contact with the secondary detent profile 56 as the engagement head 116 moves into and out of engagement with the grooves 60. The leaf spring 114 resiliently flexes so that the engagement head 116 follows the secondary detent profile 56. The secondary detent profile 56, the engagement head 116, and the leaf spring 114 are sized and shaped to provide a desired frictional resistance which can either be constant throughout the secondary detent profile 56 or vary along the secondary detent profile 56.

Figure 6:
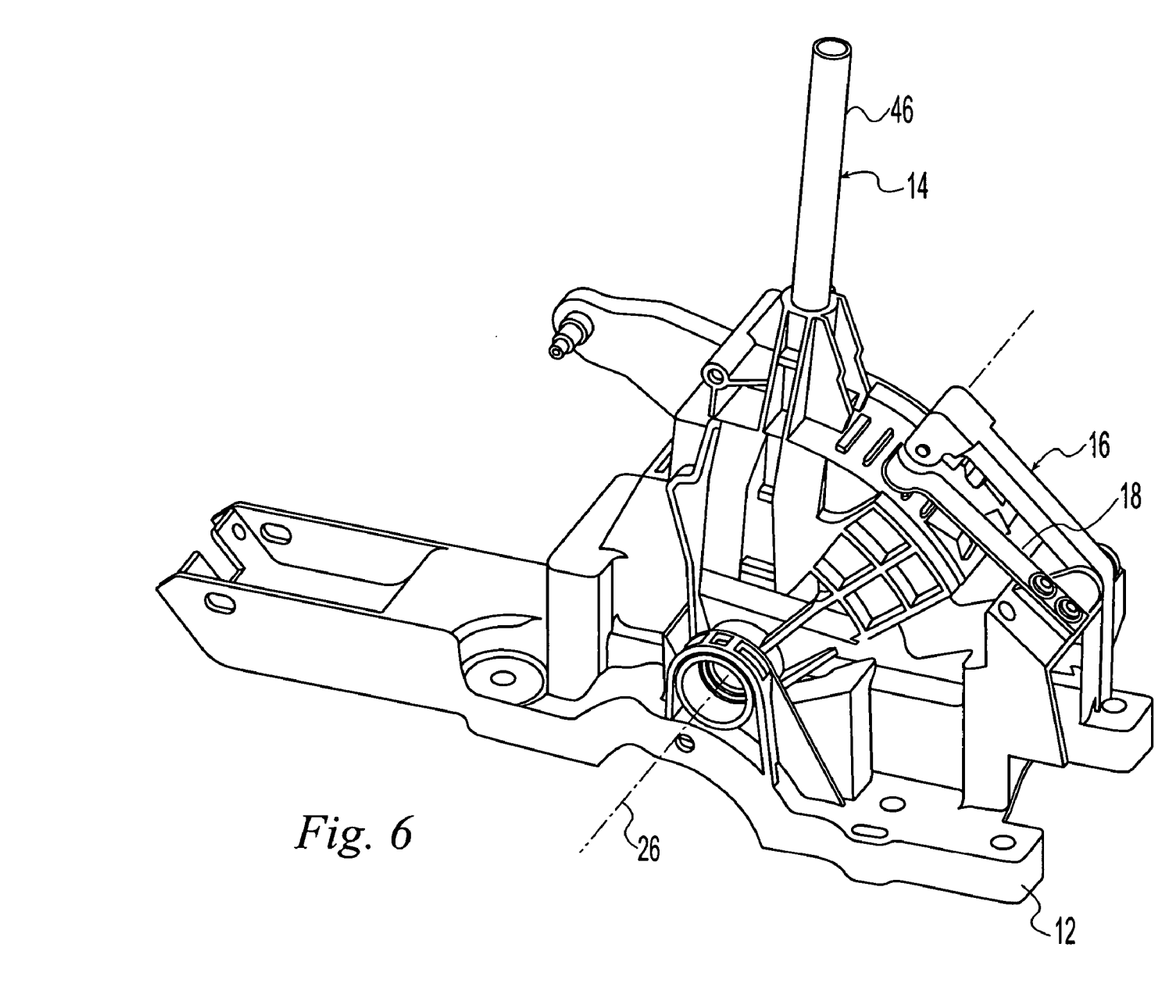
FIG. 6 is perspective view of a shifter mechanism according to an alternative preferred embodiment of the present invention.

FIG. 6 illustrates a shifter mechanism 120 according to an alternative embodiment of the present invention wherein like reference numbers are utilized for like structure. The shifter mechanism 120 according to the alternative embodiment is substantially the same as the shifter mechanism 10 described in detail above except that the actuator 36 is a pull type solenoid rather than a push type solenoid. That is, the pin 82 is in an extended position when the solenoid 36 is in an unenergized condition and a retracted condition when the solenoid is in an energized condition.

It is apparent from the above detailed description of preferred embodiments of the present invention, that the shifter mechanism has significantly improved preload capability as the pivotable detent lever 30 and roller 68 interface with the gate profile 52. The push or pull force on the shift lever 46 is transferred to the base 12 through the detent lever 30, there is no lateral force applied on the actuator 36. Additionally, the rolling contact between the gate profile 52 and the roller 68 reduces or eliminates sliding friction between the gate profile 52 and the pawl 68 to reduce the force required to pivot the detent lever 30 and unlock the pawl 68. As a result, a reduced solenoid force is required so that the solenoid 36 can be sized smaller and/or provided with a higher preload on the detent lever 30.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A shifter mechanism comprising, in combination:
    a base;
    a shifter lever pivotably mounted to the base and movable along a shift path;
    a detent profile defining a plurality of gear positions,
    a pawl movable between a locking position wherein the pawl engages the detent profile to lock the shifter lever in one of the plurality of gear positions against movement along the shift path when an operator applies a force to the shift lever to move the shift lever along the shift path and an unlocking position wherein the pawl disengages the detent profile so that the shifter lever is movable along the shift path between the plurality of gear positions when an operator applies a force to the shift lever to move the shift lever along the shift path;
    a detent lever pivotably mounted to the base and secured to the pawl so that the pawl pivots with the detent lever between the locking position and the unlocking position;
    a linear actuator operatively coupled to the pawl to selectively move the pawl from the locking position to the unlocking position;
    wherein the linear actuator is secured to the base and has a pin extendable along a linear path and extending through a slot in the detent lever to enable linear motion of the pin to pivot the detent lever relative to the base between the locking position and the unlocking position;
    wherein the pawl includes a roller that engages the detent profile when the pawl is in the locking position to lock the shifter lever in one of the plurality of gear positions against movement along the shift path when an operator applies a force to the shift lever to move the shift lever along the shift path;
    a secondary detent profile defining a plurality of gear positions;
    wherein each of the detent profile and the secondary detent profile is secured to the shifter lever to move pivot relative to the base with the shifter lever as the shifter lever moves along the shift path;
    an engagement head contacting the secondary detent profile to provide frictional resistance to movement of the shifter lever along the shift path; and
    a spring member resiliently maintaining the engagement head in contact with the secondary detent profile as the secondary detent profile pivots relative to the base with the shifter lever as the shifter lever moves along the shift path.

2. The shifter system according to claim 1, wherein said detent profile includes a plurality of grooves.

3. The shifter system according to claim 1, wherein the a linear path of the pin is perpendicular to the detent profile.

4. The shifter system according to claim 1, wherein said linear actuator is a solenoid.

5. The shifter system according to claim 1, wherein said pin is in an extended position when said actuator is energized and a retracted position when said actuator is unenergized.

6. The shifter system according to claim 1, wherein said pin is in an extended position when the pawl is in the unlocking position and a retracted position when the pawl is in the locking position.

7. The shifter system according to claim 1, wherein the roller is rotatably secured to a detent lever and the detent lever is pivotable to move the pawl between the locking position and the unlocking position.

8. The shifter system according to claim 7, wherein the pawl moves along an arcuate path between the locking position and the unlocking position and the actuator is a linear actuator which is operatively connected to the detent lever to pivot the detent lever along the arcuate path.

9. The shifter system according to claim 1, wherein pivoting motion of the detent lever relative to the base moves the pawl along an arcuate path between the locking position and the unlocking position.

10. A shifter mechanism comprising, in combination:
    a base;
    a shifter lever pivotably mounted to the base and movable along a shift path;
    a detent profile defining a plurality of gear positions,
    a pawl movable between a locking position wherein the pawl engages the detent profile to lock the shifter lever in one of the plurality of gear positions against movement along the shift path when an operator applies a force to the shift lever to move the shift lever along the shift path and an unlocking position wherein the pawl disengages the detent profile so that the shifter lever is movable along the shift path between the plurality of gear positions when an operator applies a force to the shift lever to move the shift lever along the shift path;
    a detent lever pivotably mounted to the base and carrying the pawl over an arcuate path between the locking position and the unlocking position;
    a linear actuator operatively coupled to the detent lever to selectively pivot the detent lever to move the pawl over the arcuate path from the locking position to the unlocking position;
    wherein the linear actuator is secured to the base and has a pin extendable along a linear path perpendicular to the detent profile and operatively coupled to the detent lever;
    a secondary detent profile defining a plurality of gear positions;

wherein each of the detent profile and the secondary detent profile is secured to the shifter lever to pivot relative to the base with the shifter lever as the shifter lever moves along the shift path;

an engagement head contacting the secondary detent profile to provide frictional resistance to movement of the shifter lever along the shift path; and a spring member resiliently maintaining the engagement head in contact with the secondary detent profile as the secondary detent profile moves pivots relative to the base with the shifter lever as the shifter lever moves along the shift path.

11. The shifter system according to claim 10, wherein said detent profile includes a plurality of grooves.

12. The shifter system according to claim 10, wherein the pin and the detent lever are operatively coupled together by a slot connection.

13. The shifter system according to claim 10, wherein said linear actuator is a solenoid.

14. The shifter system according to claim 10, wherein said pin is in an extended position when said actuator is energized and a retracted position when said actuator is unenergized.

15. The shifter system according to claim 10, wherein said pin is in an extended position when the pawl is in the unlocking position and a retracted position when the pawl is in the locking position.

16. The shifter system according to claim 10, wherein the pawl includes a roller that engages the detent profile when the pawl is in the locking position.

17. The shifter system according to claim 16, wherein the roller is rotatably secured to the detent lever.

18. A shifter mechanism comprising, in combination:
a shifter lever movable along a shift path;
a detent plate movable with the shifter lever along the shift path and forming a detent profile defining a plurality of gear positions,
a pawl movable between a locking position wherein the pawl engages the detent profile to lock the shifter lever in one of the plurality of gear positions and an unlocking position wherein the shifter lever is movable along the shift path between the plurality of gear positions;
an actuator operatively coupled to the pawl to selectively move the pawl;
a spring plate movable with the shifter lever along the shift path and forming a secondary detent profile;
wherein the detent plate and the spring plate are substantially parallel and spaced apart and are located on opposite lateral sides of the shifter lever;
a spring lever engaging the secondary detent profile as the shifter lever moves over the shift path to provide frictional resistance to the movement of the shifter lever; and
wherein the pawl is carried by a detent lever and the detent lever and the spring lever are spaced apart and attached to a base on opposite lateral sides of the shifter lever.

19. The shifter system according to claim 18, wherein the spring includes a leaf spring.

20. The shifter system according to claim 18, wherein said secondary detent profile includes a plurality of grooves.

* * * * *